US012634158B2

(12) United States Patent
Sakakibara et al.

(10) Patent No.: US 12,634,158 B2
(45) Date of Patent: May 19, 2026

(54) VEHICLIE-MOUNTED COMMUNICATION SYSTEM AND COMMUNICATION APPARATUS TO ENABLE RECOGNITION OF ON-BOARD DEVICES

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Koki Sakakibara, Yokkaichi (JP); Kota Oda, Yokkaich (JP)

(73) Assignees: AutoNetworks Technologies, Ltd., Yokkaichi (JP); Sumitomo Wiring Systems, Ltd, Yokkaichi (JP); Sumitomo Electric Industries, Ltd., Osaka (JP)

( * ) Notice: Subject to any disclaimer, the term of this patent is extended or adjusted under 35 U.S.C. 154(b) by 1 day.

(21) Appl. No.: 18/718,537

(22) PCT Filed: Nov. 28, 2022

(86) PCT No.: PCT/JP2022/043648
§ 371 (c)(1),
(2) Date: Jun. 11, 2024

(87) PCT Pub. No.: WO2023/112645
PCT Pub. Date: Jun. 22, 2023

(65) Prior Publication Data
US 2025/0247262 A1      Jul. 31, 2025

(30) Foreign Application Priority Data

Dec. 14, 2021    (JP) ................................ 2021-202687

(51) Int. Cl.
*H04L 12/40*        (2006.01)
*H04L 12/12*        (2006.01)
(52) U.S. Cl.
CPC ........ *H04L 12/12* (2013.01); *H04L 12/40169* (2013.01); *H04L 2012/40273* (2013.01)

(58) Field of Classification Search
None
See application file for complete search history.

(56) References Cited

U.S. PATENT DOCUMENTS

2009/0106490 A1*  4/2009  Nakasato ............ G06F 12/0804
                                            711/E12.019
2013/0311498 A1*  11/2013  Lambert ............... G06F 16/215
                                            707/758

(Continued)

FOREIGN PATENT DOCUMENTS

JP        2009-171138 A      7/2009
JP        2012-222527 A      11/2012
JP        2016-158105 A      9/2016

OTHER PUBLICATIONS

WO 2013128648 A1 (Year: 2013).*

(Continued)

*Primary Examiner* — Sandarva Khanal
(74) *Attorney, Agent, or Firm* — Brooks Kushman P.C.

(57) ABSTRACT

In a communication system, a plurality of control apparatuses control respective operations of a plurality of on-board devices. A communication apparatus communicates with the plurality of control apparatuses. A plurality of switches are provided for a plurality of supply paths for respectively supplying power to the plurality of control apparatuses. The plurality of switches are each associated in advance with one of the plurality of on-board devices. The communication apparatus includes a processing unit configured to perform processing. The processing unit is configured to provide an instruction to turn on a specific switch included in the plurality of switches. After providing the instruction to turn on the specific switch, the processing unit is configured to provide an instruction to transmit device data indicating an on-board device corresponding to the specific switch, to the plurality of control apparatuses.

11 Claims, 13 Drawing Sheets

(56) References Cited

U.S. PATENT DOCUMENTS

| 2014/0337829 | A1* | 11/2014 | Ito | H04L 41/0806 |
|---|---|---|---|---|
| | | | | 717/175 |
| 2015/0112510 | A1* | 4/2015 | Tokunaga | G06F 1/3206 |
| | | | | 701/1 |
| 2016/0020863 | A1* | 1/2016 | Kim | G07C 5/006 |
| | | | | 701/32.7 |
| 2018/0097721 | A1* | 4/2018 | Matsui | H04L 45/28 |
| 2020/0127871 | A1* | 4/2020 | Nakamura | G06F 13/4282 |
| 2020/0301695 | A1* | 9/2020 | Ogawa | B60R 16/0239 |
| 2022/0227318 | A1* | 7/2022 | Kurokawa | H02J 1/08 |
| 2023/0163939 | A1* | 5/2023 | Zeng | H04W 72/0446 |
| | | | | 370/329 |

OTHER PUBLICATIONS

WO 2021125523 A1 (Year: 2021).*
International Search Report, Application No. PCT/JP2022/043648, mailed Feb. 14, 2023. ISA/Japan Patent Office.

* cited by examiner

FIG. 4

Information table     Ti

| Power switch | Electrical device | State of power switch | ECU ID |
|---|---|---|---|
| Power switch A1 | Front-left window | On | 002 |
| Power switch A2 | Front-right window | On | 004 |
| Power switch A3 | Rear-left window | Off | 001 |
| Power switch A4 | Rear-right window | Off | 003 |

Changed by apparatus
control unit

FIG. 9

Information table Ti

| Power switch | Electrical device | State of power switch | ECU  ID |
|---|---|---|---|
| — | Front-left window | — | 002 |
| Power switch A2 | Front-right window | On | 004 |
| Power switch A3 | Rear-left window | Off | 001 |
| Power switch A4 | Rear-right window | Off | 003 |

Changed by apparatus
control unit

VEHICLIE-MOUNTED COMMUNICATION SYSTEM AND COMMUNICATION APPARATUS TO ENABLE RECOGNITION OF ON-BOARD DEVICES

CROSS-REFERENCE TO RELATED APPLICATIONS

This application is the U.S. national stage of PCT/JP2022/043648 filed on Nov. 28, 2022, which claims priority of Japanese Patent Application No. JP 2021-202687 filed on Dec. 14, 2021, the contents of which are incorporated herein.

TECHNICAL FIELD

The present disclosure relates to a communication system and a communication apparatus.

BACKGROUND

JP 2016-158105A discloses a communication system in which a plurality of ECUs (Electronic Control Units) transmit data to each other via a communication bus. Each ECU communicates with the other ECUs via the communication bus and controls the operation of on-board devices.

In JP 2016-158105A, when an ECU in a communication system is replaced with a new ECU and the new ECU does not recognize the on-board device to be controlled, the new ECU may be unable to appropriately control the operation of the on-board device.

The present disclosure has been made in view of such circumstances, and aims to provide a communication system and a communication apparatus that enables a control apparatus to recognize the target to be control.

SUMMARY

A communication system according to one aspect of the present disclosure includes: a plurality of control apparatuses configured to control respective operations of a plurality of on-board devices; and a communication apparatus configured to communicate with the plurality of control apparatuses, wherein the communication apparatus includes a processing unit configured to perform processing, one of the plurality of on-board devices is associated in advance with a switch provided for one of a plurality of supply paths for respectively supplying power to the plurality of control apparatuses, and the processing unit is configured: to provide an instruction to turn on the switch; and after providing the instruction to turn on the switch, to provide an instruction to transmit device data indicating an on-board device corresponding to the switch, to the plurality of control apparatuses.

A communication apparatus according to one aspect of the present disclosure is a communication apparatus that communicates with a plurality of control apparatuses configured to control respective operations of a plurality of on-board devices, including: a processing unit configured to perform processing, wherein one of the plurality of on-board devices is associated in advance with a switch provided for one of a plurality of supply paths for respectively supplying power to the plurality of control apparatuses and the processing unit is configured to: provide an instruction to turn on the switch; and after providing the instruction to turn on the switch, to provide an instruction to transmit device data indicating an on-board device corresponding to the switch, to the plurality of control apparatuses.

Note that the present disclosure can be realized not only as a communication system including such a characteristic processing unit, but also as a communication method including such characteristic processing as steps, or a computer program for enabling a computer to carry out such steps. In addition, the present disclosure can be realized as a semiconductor integrated circuit that implements part or all of the communication system.

Advantageous Effects

According to the above aspects, the control apparatus can recognize the target to be controlled.

BRIEF DESCRIPTION OF DRAWINGS

FIG. 4 is a chart showing the contents of an information table.

FIG. 9 is a chart showing the contents of an information table.

DETAILED DESCRIPTION OF PREFERRED EMBODIMENTS

Figure 1:
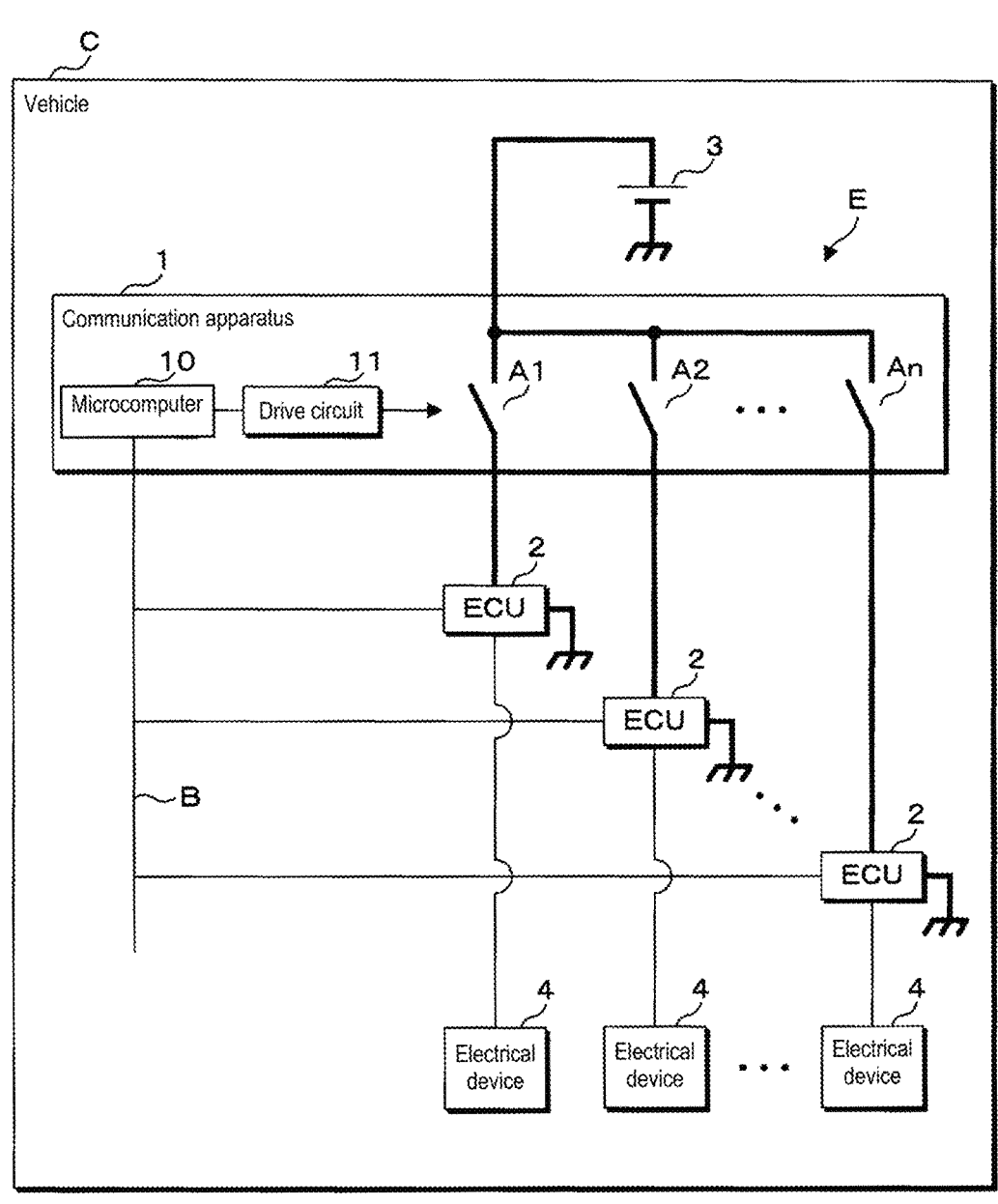
FIG. 1 is a block diagram showing a configuration of a main part of a communication system according to a first embodiment.

First, embodiments of the present disclosure will be listed and described. At least some of the embodiments described below may be combined in any manner.

A communication system according to one aspect of the present disclosure is a communication system including: a plurality of control apparatuses configured to control respective operations of a plurality of on-board devices; and a communication apparatus configured to communicate with the plurality of control apparatuses, wherein the communication apparatus includes a processing unit configured to perform processing, one of the plurality of on-board devices is associated in advance with a switch provided for one of a plurality of supply paths for respectively supplying power to the plurality of control apparatuses, and the processing unit of the communication apparatus is configured: to provide an instruction to turn on the switch; and after providing the instruction to turn on the switch, to provide an instruction to transmit device data indicating an on-board device corresponding to the switch, to the plurality of control apparatuses.

In a communication system according to one aspect of the present disclosure, two or more switches are provided, the plurality of switches are respectively provided for the plurality of supply paths, the plurality of switches are each associated in advance with one of the plurality of on-board devices, and the processing unit of the communication apparatus is configured: to provide an instruction to turn on a specific switch included in the plurality of switches; and after providing the instruction to turn on the specific switch, to provide an instruction to transmit device data indicating an on-board device corresponding to the specific switch, to the plurality of control apparatuses.

In a communication system according to one aspect of the present disclosure, the communication apparatus includes one or more or all of the plurality of switches.

In a communication system according to one aspect of the present disclosure, the plurality of supply paths are n supply paths, n is an integer greater than or equal to 2, $n-1$ switches are provided, the $n-1$ switches are respectively provided for $n-1$ supply paths, the $n-1$ switches are each associated in advance with one of the plurality of on-board devices, and the processing unit of the communication apparatus is configured: to provide an instruction to turn on a specific switch included in the $n-1$ switches; and after providing the instruction to turn on the specific switch, to provide an instruction to transmit device data indicating an on-board device corresponding to the specific switch, to the plurality of control apparatuses.

In a communication system according to one aspect of the present disclosure, n is an integer greater than or equal to 3, and the communication apparatus includes one or more or all of the $n-1$ switches.

In a communication system according to one aspect of the present disclosure, each of the control apparatuses includes: a data storage unit to which the device data is written; and a second processing unit configured to perform processing, the device data is deleted from the data storage unit when the power supply to the control apparatus is stopped, when device data has been received from the communication apparatus and device data is not stored in the data storage unit, the second processing unit is configured to write the device data received from the communication apparatus to the data storage unit, and when device data has been received from the communication apparatus and device data is stored in the data storage unit, the device data stored the data storage unit is retained.

In a communication system according to one aspect of the present disclosure, when the second processing unit writes the device data received from the communication apparatus to the data storage unit, the second processing unit is configured to provide an instruction to transmit data to the communication apparatus.

In a communication system according to one aspect of the present disclosure, the plurality of on-board devices are configured to perform the same operations.

A communication apparatus according to one aspect of the present disclosure is a communication apparatus that communicates with a plurality of control apparatuses configured to control respective operations of a plurality of on-board devices, including a processing unit configured to perform processing, wherein one of the plurality of on-board devices is associated in advance with a switch provided for one of a plurality of supply paths for respectively supplying power to the plurality of control apparatuses, and the processing unit is configured: to provide an instruction to turn on the switch; and after providing the instruction to turn on the switch, to provide an instruction to transmit device data indicating an on-board device corresponding to the switch, to the plurality of control apparatuses.

In the communication system and the communication apparatus according to the above aspects, the control apparatus connected to the switch operates when the switch is turned on. The control apparatus can recognize the on-board device to be controlled, based on the device data received from the communication apparatus after the switch has been turned on.

In the communication system according to the above aspects, a plurality of switches are provided for a plurality of supply paths, respectively. The control apparatus connected to the specific switch is activated when the specific switch is turned on. The control apparatus can recognize the on-board device to be controlled, based on the device data received from the communication apparatus after the specific switch has been turned on.

In the communication system according to the above aspects, the communication apparatus includes one or more or all of the plurality of switches respectively provided for the plurality of supply paths.

In the communication system according to the above aspects, $n-1$ switches are respectively provided for $n-1$ supply paths. The control apparatus connected to the specific switch is activated when the specific switch is turned on. The control apparatus can recognize the on-board device to be controlled, based on the device data received from the communication apparatus after the specific switch has been turned on.

In the communication system according to the above aspects, n is an integer greater than or equal to 3. The communication apparatus includes one or more or all of the $n-1$ switches respectively provided for the $n-1$ supply paths.

In the communication system according to the above aspects, the device data is deleted from the data storage unit when the power supply to the control apparatus is stopped. When a plurality of switches are respectively provided for a plurality of supply paths, the plurality of switches are sequentially turned on. In this configuration, when the communication apparatus transmits device data to the plurality of control apparatuses, only the control apparatus connected to the specific switch writes the transmitted device data to the data storage unit. The control apparatus recognizes the on-board device indicated by the device data stored in the storage unit as the target to be controlled.

In the communication system according to the above aspects, when the control apparatus writes device data to the data storage unit, the control apparatus transmits the data to the communication apparatus. Therefore, the communication apparatus recognizes the on-board device corresponding to the switch.

In the communication system according to the above aspects, the plurality of on-board devices are left and right windows, for example. In this case, operations performed to open and close the windows are performed as the same operations.

Specific examples of a communication system according to embodiments of the present disclosure will be described below with reference to the drawings. Note that the present disclosure is not limited to these examples, but is indicated by the scope of the claims, and is intended to include all changes within the meaning and scope equivalent to the scope of the claims.

First Embodiment

Configuration of Communication System

FIG. 1 is a block diagram showing a configuration of a main part of a communication system E according to a first embodiment. The communication system E is mounted on a vehicle C. The communication system E includes a communication apparatus 1, n ECUs 2, and a communication bus B. Here, n is an integer greater than or equal to 2. In addition to the communication system E, a DC power supply 3 and a plurality of electrical devices 4 are mounted on the vehicle C. The DC power supply 3 is a battery, for example.

The communication apparatus 1 includes a microcomputer 10, a drive circuit 11, and n power switches A1, A2, . . . , and An. In FIG. 1, wire conductors associated with power supply are expressed as bold lines. Wire conductors not associated with power supply and communication lines are expressed as thin lines. Hereinafter, "k" expresses a natural number less than or equal to the integer "n". The natural number k may be any of 1, 2, . . . , and n.

The negative terminal of the DC power supply 3 is grounded. Grounding is achieved by a connection to the body of the vehicle C, for example. The positive terminal of the DC power supply 3 is connected to one end of the power switch Ak. The other end of the power switch Ak is connected to an ECU 2. Each ECU 2 is grounded. Furthermore, an electrical device 4 is connected to each ECU 2. The microcomputer 10 and the n ECUs 2 are connected to the communication bus B. The microcomputer 10 is further connected to a drive circuit 11.

Figure 2:
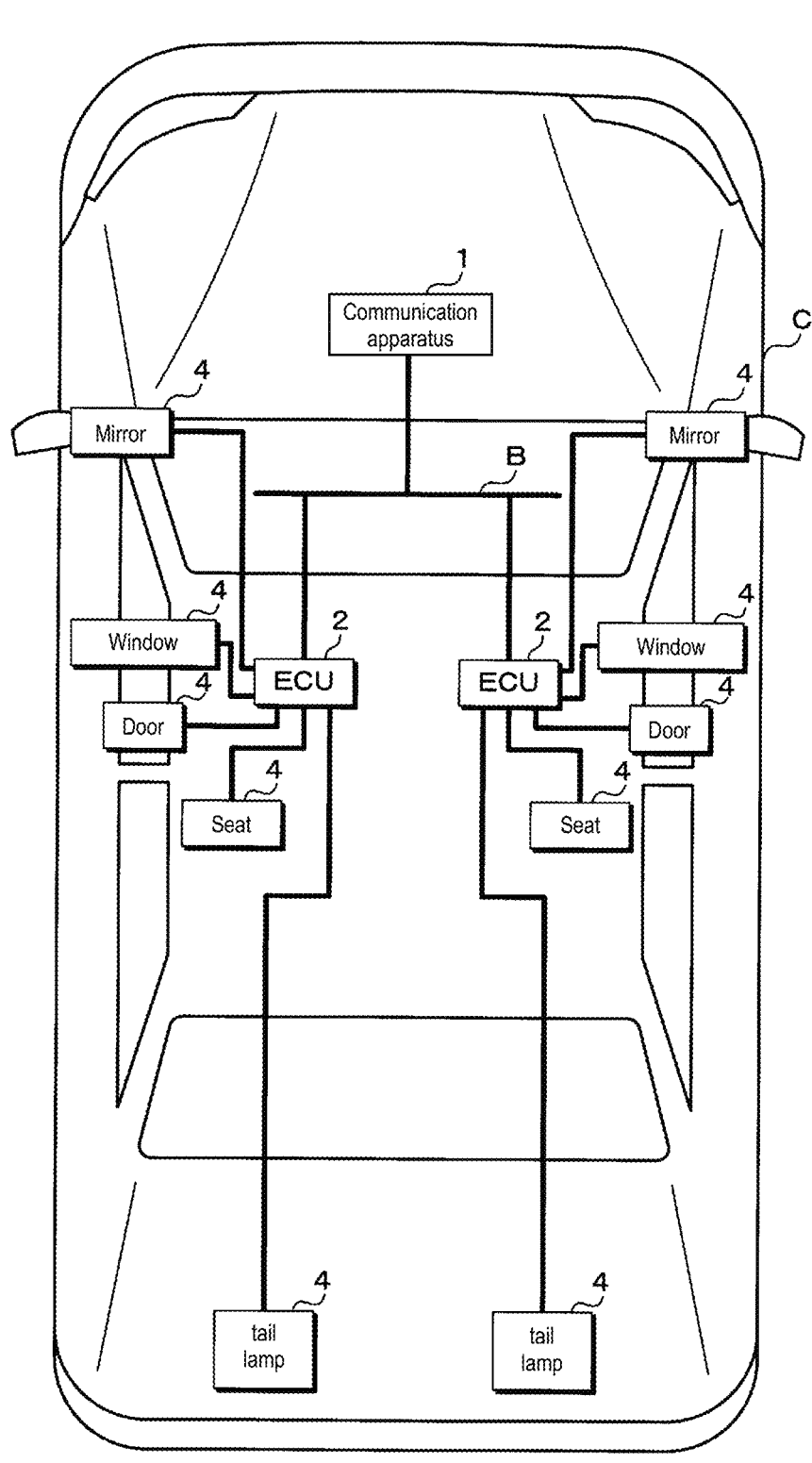
FIG. 2 is a diagram illustrating a configuration in which a plurality of electrical devices are connected to one ECU.

In the example in FIG. 1, one electrical device 4 is connected to each ECU 2. However, a plurality of electrical devices 4 may be connected to each ECU 2. FIG. 2 illustrates a configuration in which a plurality of electrical devices 4 are connected to each ECU 2. In the example in FIG. 2, the integer n is 2 and four electrical devices 4 are connected to each ECU 2. Mirrors, windows, doors, seats, and tail lamps located on the left side of the vehicle C are connected to one ECU 2 as electrical devices 4. Mirrors, windows, doors, seats, and tail lamps located on the right side of the vehicle C are connected to the other ECU 2 as electrical devices 4.

Electrical devices 4 that perform the same operations are connected to each ECU 2. The mirrors on the left side and the right side are two kinds of electrical devices 4 that perform the same operations. Examples of the same operations include a mirror angle adjustment. The plurality of windows of the vehicle C are also electrical devices 4 that perform the same operations. Examples of the same operations include opening and closing the windows. Electrical devices 4 that perform the same operations are connected to the n ECUs 2, and therefore, if electrical devices 4 connected to one ECU 2 are only windows, windows are also connected to the other ECU 2. The number of mirrors, windows, doors, seats, and tail lamps is usually two or more. The electrical devices 4 function as the on-board devices. The following describes a configuration in which electrical devices 4 of the same type that perform the same operations are connected to the ECUs 2.

The microcomputer 10 outputs to the drive circuit 11 an ON signal that instructs the drive circuit 11 to turn on the power switch Ak, and an OFF signal that instructs the drive circuit 11 to turn off the power switch Ak. The drive circuit

11 turns on the power switch Ak when an ON signal for the power switch Ak is input thereto. The drive circuit 11 turns off the power switch Ak when an OFF signal for the power switch Ak is input thereto. In this way, the drive circuit 11 turns each of the n power switches A1, A2, . . . , and An on or off.

When the power switch Ak is switched from OFF to ON, current flows from the positive terminal of the DC power supply 3 to the power switch Ak, the ECU 2, and the negative terminal of the DC power supply 3 in this order, and power is supplied to the ECU 2 connected to the power switch Ak. As a result, this ECU 2 is activated.

As described above, n power switches are provided for the n supply paths for supplying power to the n ECUs 2, respectively.

When a power switch Ak is switched from ON to OFF, the power supply to the ECU 2 connected to that power switch Ak is stopped. As a result, this ECU 2 stops operating.

Each ECU 2 outputs an operation signal, indicating the operation of the electrical device 4, to the electrical device 4 connected thereto. When receiving the input operation signal, the electrical device 4 performs the operation indicated by the input operation signal. In this way, each ECU 2 controls the operation of the electrical device 4 connected thereto. The ECUs 2 function as control apparatuses.

The microcomputer 10 and the n ECUs 2 transmit data via the communication bus B. The data transmitted via the communication bus B is received by all the apparatuses connected to the communication bus B. The communication via the communication bus B is performed according to, for example, the CAN (Controller Area Network) protocol. The plurality of apparatuses connected to the communication bus B are the microcomputer 10 and the n ECUs 2. Therefore, the microcomputer 10 communicates with the n ECUs 2. The data transmitted via the communication bus B includes main information to be notified to the transmission destination apparatus and transmission destination information indicating the transmission destination. An ID (Identification Data) is assigned to each of the microcomputer 10 and the n ECUs 2. Transmission destination information indicates an ID as the transmission destination.

When the microcomputer 10 receives data via the communication bus B, if the destination information in the received data indicates the ID of the microcomputer 10, the microcomputer 10 performs processing that is based on the received data. Similarly, when any of the ECUs 2 receives data via the communication bus B, if the transmission destination information in the received data indicates the ID of the ECU 2, the ECU 2 performs processing that is based on the received data. Each ECU 2 determines the operation of the electrical device 4 connected thereto based on the received data, and outputs an operation signal to the electrical device 4 indicating the determined operation.

One kind of data that the microcomputer 10 transmits via the communication bus B is device data in which main information indicates an electrical device 4. The transmission destination information in the device data indicates the IDs of the n ECUs 2. As will be described later, the transmission of device data enables at least one of the n ECUs 2 to recognize the control target electrical device 4 whose operation is to be controlled.

One kind of data that the ECUs 2 transmit includes ID data in which the main information indicates the ID of the transmission source ECU 2. The transmission destination information in the ID data indicates the ID of the microcomputer 10. When the microcomputer 10 receives ID data, the microcomputer 10 specifies the ECU 2 connected to the power switch Ak, based on the ID of the ECU 2 indicated by the main information in the received ID data.

Configurations of Microcomputer 10 and ECUs 2

Figure 3:
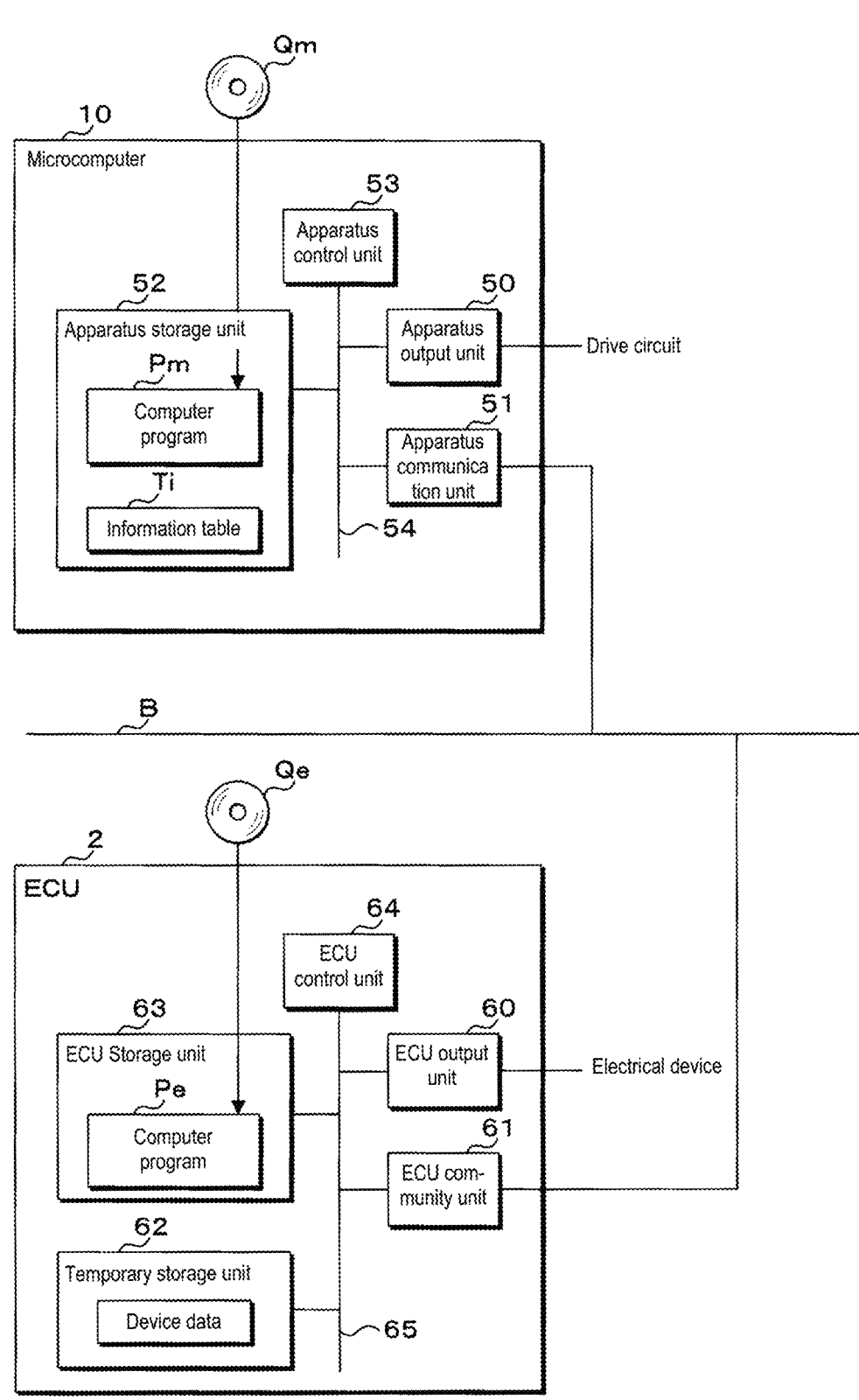
FIG. 3 is a block diagram showing configurations of main parts of a microcomputer and an ECU.

FIG. 3 is a block diagram showing configurations of main parts of the microcomputer 10 and an ECU 2. The configuration of the microcomputer 10 will be described next. The microcomputer 10 includes an apparatus output unit 50, an apparatus communication unit 51, an apparatus storage unit 52, and an apparatus control unit 53. These units are connected to an internal bus 54. The apparatus output unit 50 is further connected to the drive circuit 11. The apparatus communication unit 51 is further connected to the communication bus B.

The apparatus output unit 50 outputs an ON signal and an OFF signal for the power switch Ak to the drive circuit 11, in accordance with an instruction from the apparatus control unit 53. The apparatus communication unit 51 transmits data to the n ECUs 2 via the communication bus B. One example of data that the apparatus communication unit 51 transmits is device data. The apparatus communication unit 51 receives data transmitted by the ECUs 2 via the communication bus B. One example of data that the apparatus communication unit 51 receives is ID data.

The apparatus storage unit 52 is a non-volatile memory, for example. The apparatus storage unit 52 stores an information table Ti indicating information regarding the n power switches A1, A2, . . . , and An.

FIG. 4 is a chart showing the contents of the information table Ti. FIG. 4 shows an example in which the integer n is 4. The information table Ti stores the electrical device 4 corresponding to the power switch Ak, the state of the power switch Ak, and the ID of the ECU 2 connected to the power switch Ak. The state of the power switch Ak is expressed as ON or OFF.

One of the plurality of electrical devices 4 is associated in advance with each of the power switches A1, A2, . . . , and An. In the example in FIG. 4, the power switches A1, A2, A3, and A4 are associated with front-left, front-right, rear-left, and rear-right windows, respectively. When the power switch Ak is switched from OFF to ON, the apparatus control unit 53 specifies the ECU 2 connected to the power switch Ak. Thereafter, the apparatus control unit 53 changes the ID of the ECU 2 corresponding to the power switch Ak to the ID of the specified ECU 2.

The apparatus storage unit 52 further stores a computer program Pm. The apparatus control unit 53 includes a processing device that performs processing, such as a CPU (Central Processing Unit). The apparatus control unit 53 functions as the processing unit. The processing device of the apparatus control unit 53 performs data transmission processing, change processing, and so on by executing the computer program Pm. Data transmission processing is processing that is performed to transmit data different from device data via the communication bus B. The ECU 2 determines the operation of the electrical device 4 based on the data transmitted through data transmission processing. Change processing is processing that is performed to change the IDs of the ECUs 2 in the information table Ti.

Note that the computer program Pm may be provided to the microcomputer 10 using a non-temporary storage medium Qm that stores the computer program Pm in a readable form. The storage medium Qm is a portable memory, for example. Examples of portable memory include a CD-ROM, a USB (Universal Serial Bus) memory, an SD card, a micro SD card, a Compact Flash (registered trademark), and so on. When the storage medium Qm is a portable memory, the processing device of the apparatus control unit 53 may read the computer program Pm from the storage medium Qm using a reader apparatus (not shown). The read computer program Pm is written to the apparatus storage unit 52. Furthermore, the computer program Pm may be provided to the microcomputer 10 by a communication unit (not shown) of the microcomputer 10 communicating with an external apparatus. In this case, the processing device of the apparatus control unit 53 acquires the computer program Pm through the communication unit. The acquired computer program Pm is written to the apparatus storage unit 52.

The number of processing devices included in the apparatus control unit 53 is not limited one, and may be two or more. When the apparatus control unit 53 includes a plurality of processing devices, the plurality of processing devices may cooperate to perform data transmission processing, change processing, and so on.

Next, the configuration of each ECU 2 will be described. All the ECUs 2 have the same configuration. Each ECU 2 includes an ECU output unit 60, an ECU communication unit 61, a temporary storage unit 62, an ECU storage unit 63, and an ECU control unit 64. These units are connected to an internal bus 65. The ECU output unit 60 is further connected to an electrical device 4. The ECU communication unit 61 is further connected to the communication bus B.

The ECU output unit 60 outputs an operation signal to the electrical device 4 according to an instruction from the ECU control unit 64. The ECU communication unit 61 receives data transmitted by the apparatus communication unit 51 of the microcomputer 10. The ECU communication unit 61 transmits data via the communication bus B according to an instruction from the ECU control unit 64. One example of data that the ECU communication unit 61 transmits is device data.

The temporary storage unit 62 is a volatile memory such as a RAM (Random Access Memory). The ECU control unit 64 writes device data to the temporary storage unit 62. When the power supply to the ECU 2 stops, the device data is deleted from the temporary storage unit 62.

The ECU storage unit 63 is a non-volatile memory, for example. The ECU storage unit 63 stores a computer program Pe. The ECU control unit 64 includes a processing device that performs processing, such as a CPU. The ECU control unit 64 functions as the second processing unit. The processing device of the ECU control unit 64 performs control processing and writing processing by executing the computer program Pe. Control processing is processing that is performed to control the operation of the electrical device 4. Writing processing is processing that is performed by the ECU control unit 64 to write device data to the temporary storage unit 62.

Note that the computer program Pe may be provided to the ECU 2 using a non-temporary storage medium Qe that stores the computer program Pe in a readable form. The storage medium Qe is a portable memory, for example. When the storage medium Qe is a portable memory, the processing device of the ECU control unit 64 may read the computer program Pe from the storage medium Qe using a reader apparatus (not shown). The acquired computer program Pe is written to the ECU storage unit 63. Furthermore, the computer program Pe may be provided to the ECU 2 by a communication unit (not shown) of the ECU 2 communicating with an external apparatus. In this case, the processing device of the ECU control unit 64 acquires the computer program Pe through the communication unit. The acquired computer program Pe is written to the ECU storage unit 63.

The number of processing devices included in the ECU control unit 64 is not limited one, and may be two or more. When the ECU control unit 64 includes a plurality of processing devices, the plurality of processing devices may cooperate to perform control processing, writing processing, and so on.

Data Transmission Processing and Control Processing

As described above, the apparatus control unit 53 of the microcomputer performs data transmission processing. In data transmission processing, the apparatus control unit 53 determines whether or not one of the plurality of electrical devices 4 is to perform a new operation. If the apparatus control unit 53 determines that none of the plurality of electrical devices 4 is to perform a new operation, the apparatus control unit 53 waits until a new operation that one of the plurality of electrical devices 4 is to perform occurs.

If the apparatus control unit 53 determines that one of the plurality of electrical devices 4 is to perform a new operation, the apparatus control unit 53 determines whether or not the power switch corresponding to the electrical device 4 that is to perform a new operation of the n power switches A1, A2, . . . , and An is ON, based on the information table Ti. If the power switch is OFF, the apparatus control unit 53 waits until the power switch is turned on.

If the apparatus control unit 53 determines that the power switch is ON, or when the power switch is turned on, the apparatus control unit 53 reads out the ID of the ECU 2 corresponding to the electrical device 4 that is to perform a new operation from the information table Ti. The apparatus control unit 53 instructs the apparatus communication unit 51 to transmit the data in which the ID thus read out is indicated by the transmission destination information to the n ECUs 2 via the communication bus B. This data indicates the operation to be newly performed by the electrical device 4. After instructing the apparatus communication unit 51 to transmit the data, the apparatus control unit 53 terminates data transmission processing. After data transmission processing is terminated, the apparatus control unit 53 performs data transmission processing again.

The ECU control unit 64 of each ECU 2 repeatedly performs control processing. In control processing, the ECU control unit 64 first determines whether or not the ECU communication unit 61 has received data in which the transmission destination information indicates the ID of the ECU 2 including the ECU control unit 64 and that is different from device data. If the ECU communication unit 61 has not received data, the ECU control unit 64, the ECU control unit 64 waits until the ECU communication unit 61 receives data in which the transmission destination information indicates the ID of the ECU 2 including the ECU control unit 64 and that is different from device data.

If the ECU control unit 64 determines that the ECU communication unit 61 has received data in which the transmission destination information indicates the ID of the ECU 2 including the ECU control unit 64 and that is different from device data, the ECU control unit 64 determines the operation of the electrical device 4 connected to the ECU output unit 60 based on the received data. Next, the ECU control unit 64 instructs the ECU output unit 60 to output an operation signal indicating the determined operation to the electrical device 4. As a result, the electrical device 4 performs the operation determined by the ECU control unit 64. After instructing the ECU output unit 60 to output the operation signal to the electrical device 4, the ECU control unit 64 terminates control processing. Thereafter, the ECU control unit 64 performs control processing again.

Change Processing and Writing Processing

Figure 5:
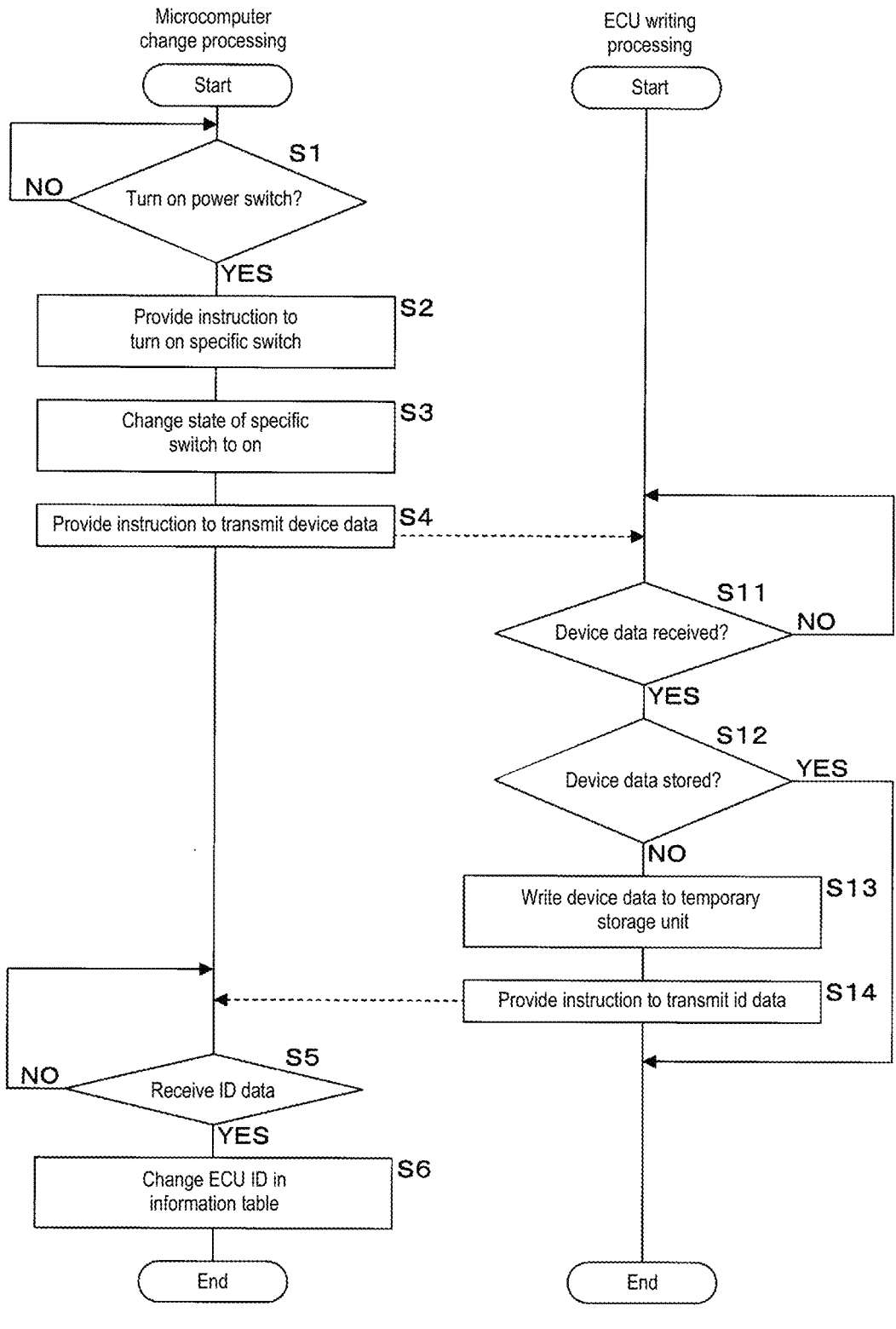
FIG. 5 is a flowchart showing procedures for change processing and writing processing.

FIG. 5 is a flowchart showing procedures for change processing and writing processing. As described above, the apparatus control unit 53 of the microcomputer 10 performs change processing. In change processing, the apparatus control unit 53 determines whether or not to turn on one power switch of the n power switches A1, A2, . . . , and An (step S1). In step S1, if the apparatus control unit 53, in data transmission processing, determines that the power switch corresponding to the electrical device 4 that is to perform a new operation is OFF, the apparatus control unit 53 determines that one power switch of the n power switches A1, A2, . . . , and An is to be turned on.

If the apparatus control unit 53 determines that none of the n power switches A1, A2, . . . , and An is to be turned on (S1: NO), the apparatus control unit 53 carries out step S1 again, and waits until it is time to turn on one power switch of the n power switches A1, A2, . . . , and An.

Hereinafter, the power switch to be turned on of the power switches A1, A2, . . . , and An is referred to as "the specific switch". When the apparatus control unit 53 determines that one power switch of the n power switches A1, A2, . . . , and An is to be turned on (S1: YES), the apparatus control unit 53 instructs the drive circuit 11 to turn on the specific switch (step S2). As a result, the specific switch is turned on, and accordingly the DC power supply 3 supplies power to the electrical device 4 connected to the specific switch. The apparatus control unit 53 instructs the drive circuit 11 to turn on the power switch by instructing the apparatus output unit 50 to output an ON signal for the specific switch.

Next, the apparatus control unit 53 changes the state of the specific switch in the information table Ti to ON (step S3). In FIG. 4, when the specific switch is the power switch A1, the state of the power switch A1 is changed from OFF to ON. After carrying out step S3, the apparatus control unit 53 instructs the apparatus communication unit 51 to transmit the device data in the information table Ti indicating the electrical device 4 corresponding to the specific switch to the n ECUs 2 via the communication bus B (step S4). In FIG. 4, when the specific switch is the power switch A1, the apparatus control unit 53 instructs the apparatus communication unit 51 to transmit the device data indicating the front-left window. As described above, the transmission destination information in the device data indicates the IDs of the n ECUs 2.

As described above, writing processing is performed by the ECU control unit 64 of each ECU 2. In writing processing, the ECU control unit 64 first determines whether or not the ECU communication unit 61 has received device data from the apparatus communication unit 51 of the microcomputer 10 (step S11). If the ECU control unit 64 determines that the ECU communication unit 61 has not received device data (S11: NO), the ECU control unit 64 carries out step S11 again, and waits until the ECU communication unit 61 receives device data.

If the ECU control unit 64 determines that the ECU communication unit 61 has received device data (S11: YES), the ECU control unit 64 determines whether or not device data different from the device data received by the ECU communication unit 61 is stored in the temporary storage unit 62 (step S12). If the ECU control unit 64 determines that the device data is not stored in the temporary storage unit 62 (S12: NO), the ECU control unit 64 writes the device data received by the ECU communication unit 61 to the temporary storage unit 62 (step S13). The temporary storage unit 62 functions as the data storage unit. After carrying out step S13, the ECU control unit 64 instructs the ECU communication unit 61 to transmit ID data to the microcomputer 10 and the other ECUs 2 via the communication bus B (step S14). The transmission destination information in the ID data indicates the ID of the microcomputer 10. The main information in the ID data indicates the ID of the ECU 2 that has written the device data to the temporary storage unit 62.

If the ECU control unit 64 determines that the device data is stored in the temporary storage unit 62 (S12: YES), the ECU control unit 64 terminates writing processing. Therefore, the device data stored in the temporary storage unit 62 is retained. After carrying out step S14, the ECU control unit 64 terminates writing processing. After terminating writing processing, the ECU control unit 64 performs writing processing again.

In change processing, the apparatus control unit 53 of the microcomputer 10, after carrying out step S4, determines whether or not the apparatus communication unit 51 has received ID data (step S5). If the apparatus control unit 53 determines that the ECU communication unit 61 has not received ID data (S5: NO), the apparatus control unit 53 carries out step S5 again and waits until the apparatus communication unit 51 receives ID data.

If the apparatus control unit 53 determines that the apparatus communication unit 51 has received ID data (S5: YES), the apparatus control unit 53 changes the ID of the ECU 2 corresponding to the specific switch in the information table Ti to the ID indicated by the ID data received by the ECU communication unit 61 (step S6). After carrying out step S6, the apparatus control unit 53 terminates change processing. After change processing is terminated, the apparatus control unit 53 performs change processing again.

Turning Power Switch Ak Off

For example, when the operations of all the electrical devices 4 connected to the power switch Ak have stopped, the apparatus control unit 53 of the microcomputer 10 instructs the drive circuit 11 to turn off the power switch Ak. The apparatus control unit 53 instructs the drive circuit 11 to turn off the power switch Ak by instructing the apparatus output unit 50 so that the drive circuit 11 outputs an OFF signal for the power switch Ak. After all the power switches A1, A2, . . . , and An have been turned off, the power supply to the microcomputer 10 stops.

Examples of Operations of Microcomputer 10 and Plurality of ECUs 2

Figure 6:
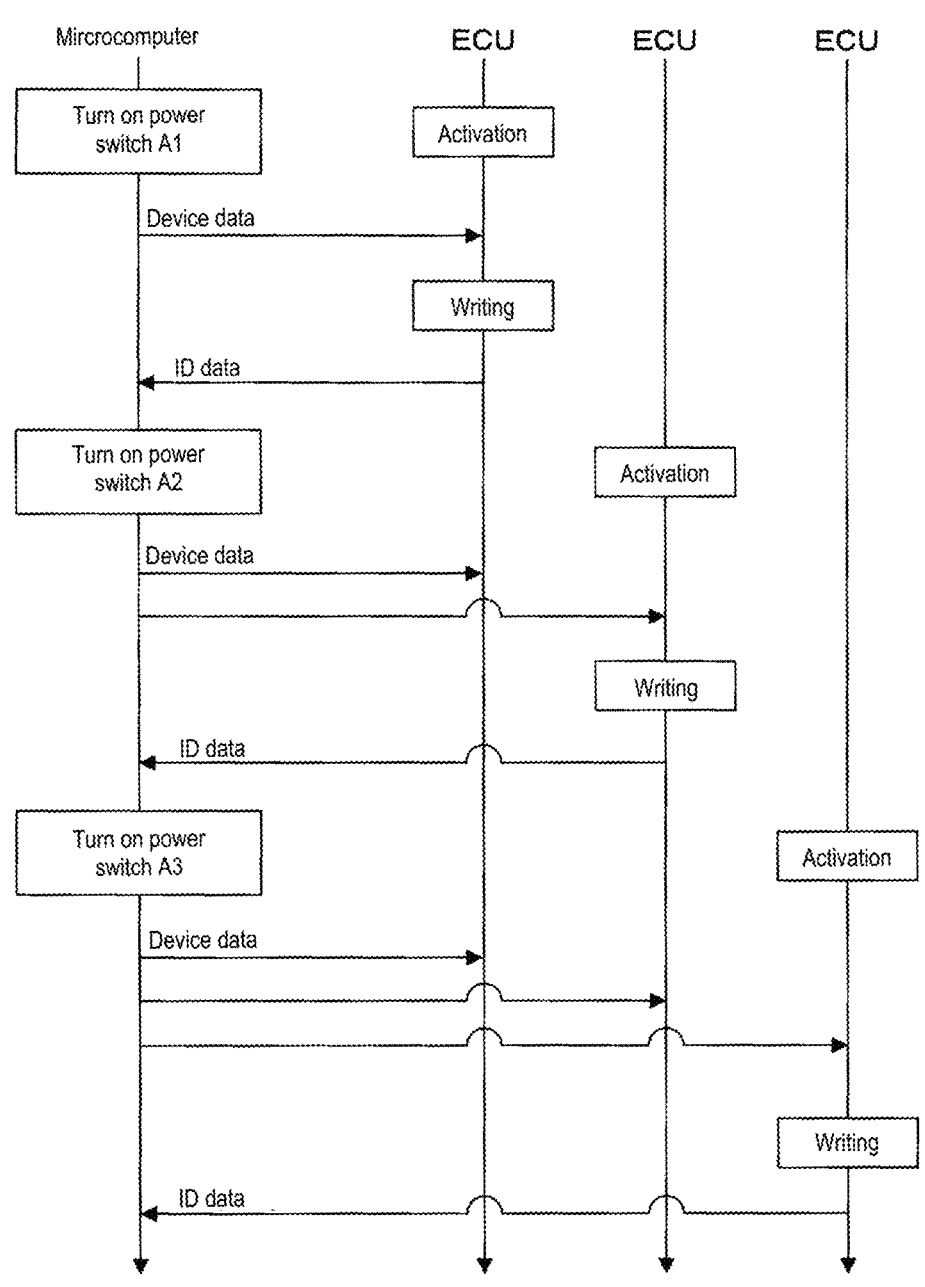
FIG. 6 is a sequence diagram showing example operations of a microcomputer and a plurality of ECUs.

FIG. 6 is a sequence diagram showing example operations of the microcomputer 10 and the plurality of ECUs 2. FIG. 6 shows an example in which the integer n is 3. FIG. 6 shows the operations of the microcomputer 10 and the n ECUs 2 started when the n power switches A1, A2, . . . , and An are OFF. Since the power switches A1, A2, . . . , and An are OFF, device data is not stored in the temporary storage units 62 of the n ECUs 2.

In order to enable the electrical device 4 corresponding to the power switch A1 to operate, the apparatus control unit 53 of the microcomputer 10 instructs the drive circuit 11 to turn on the power switch A1 that functions as the specific switch. As a result, the ECU 2 connected to the power switch A1 is activated. The apparatus communication unit 51 of the microcomputer 10 transmits the device data indicating the electrical device 4 corresponding to the power switch A1 to the n ECUs 2 via the communication bus B. At this time, only the ECU 2 connected to the power switch A1 is activated, and therefore, only the ECU communication unit 61 of the ECU 2 connected to the power switch A1 receives the device data.

The ECU control unit 64 of the ECU 2 corresponding to the power switch A1 writes the device data received by the ECU communication unit 61 to the temporary storage unit 62. As a result, the device data indicating the electrical device 4 corresponding to the power switch A1 is only stored in the temporary storage unit 62 of the ECU 2 connected to the power switch A1. The ECU control unit 64 recognizes the electrical device 4 memorized in the temporary storage unit 62 as the electrical device 4 to be controlled.

After the ECU control unit 64 of the ECU 2 corresponding to the power switch A1 has written the device data to the temporary storage unit 62, the ECU communication unit 61 of the ECU 2 connected to the power switch A1 transmits the ID data in which the main information indicates the ID of the ECU 2 to the apparatus communication unit 51 of the microcomputer 10. The apparatus control unit 53 of the microcomputer 10 changes the ID of the ECU 2 corresponding to the power switch A1 in the information table Ti to the ID indicated by the ID data received by the apparatus communication unit 51.

In the example in FIG. 6, after turning on the power switch A1, the apparatus control unit 53 of the microcomputer 10 instructs the drive circuit 11 to turn on the power switch A2 that functions as the specific switch in order to enable the electrical device 4 corresponding to the power switch A2 to operate. As a result, the ECU 2 connected to the power switch A2 is activated. The apparatus control unit 53 of the microcomputer 10 transmits the device data indicating the electrical device 4 corresponding to the power switch A2 to the n ECUs 2 via the communication bus B. At this time, the ECUs 2 respectively connected to the power switches A1 and A2 are activated, and therefore, the ECU communication units 61 of the two ECUs 2 respectively connected to the power switches A1 and A2 receive the device data indicating the electrical device 4 corresponding to the power switch A2.

The device data indicating the electrical device 4 corresponding to the power switch A1 is stored in the temporary storage unit 62 of the ECU 2 connected to the power switch A1. Therefore, in the ECU 2 connected to the power switch A1, the device data stored in the temporary storage unit 62 is retained. The device data stored in the temporary storage unit 62 of the ECU 2 connected to the power switch A1 is not changed to the device data indicating the electrical device 4 corresponding to the power switch A2.

The ECU control unit 64 of the ECU 2 connected to the power switch A2 writes the device data received by the ECU communication unit 61 to the temporary storage unit 62. As a result, the device data indicating the electrical device 4 corresponding to the power switch A2 is only stored in the temporary storage unit 62 of the ECU 2 connected to the power switch A2. The ECU control unit 64 recognizes the electrical device 4 memorized in the temporary storage unit 62 as the electrical device 4 to be controlled.

After the ECU control unit 64 of the ECU 2 connected to the power switch A2 has written the device data to the temporary storage unit 62, the ECU communication unit 61 of the ECU 2 connected to the power switch A2 transmits the ID data in which the main information indicates the ID of the ECU 2 to the apparatus communication unit 51 of the microcomputer 10. The apparatus control unit 53 of the microcomputer 10 changes the ID of the ECU 2 corresponding to the power switch A2 in the information table Ti to the ID indicated by the ID data received by the apparatus communication unit 51.

In the example in FIG. 6, after turning on the power switch A2, the apparatus control unit 53 of the microcomputer 10 instructs the drive circuit 11 to turn on the power switch A3 that functions as the specific switch in order to enable the electrical device 4 corresponding to the power switch A3 to operate. As a result, the ECU 2 connected to the power switch A3 is activated. The apparatus control unit 53 of the microcomputer 10 transmits the device data indicating the electrical device 4 corresponding to the power switch A3 to the n ECUs 2 via the communication bus B. At this time, the ECUs 2 respectively connected to the three power switches A1, A2, and A3 are activated, and therefore, the ECU communication units 61 of the three ECUs 2 respectively connected to the power switches A1, A2, and A3 receive the device data indicating the electrical device 4 corresponding to the power switch A3.

The device data indicating the electrical devices 4 corresponding to the power switches A1 and A2 is stored in the temporary storage units 62 of the ECUs 2 respectively connected to the power switches A1 and A2. Therefore, in the two ECUs 2 respectively connected to the power switches A1 and A2, the device data stored in the respective temporary storage units 62 is retained. The device data stored in the respective temporary storage units 62 of the ECUs 2 respectively connected to the power switches A1 and A2 is not changed to the device data indicating the electrical device 4 corresponding to the power switch A3.

The ECU control unit 64 of the ECU 2 connected to the power switch A3 writes the device data received by the ECU communication unit 61 to the temporary storage unit 62. As a result, the device data indicating the electrical device 4 corresponding to the power switch A3 is only stored in the temporary storage unit 62 of the ECU 2 connected to the power switch A3. The ECU control unit 64 recognizes the electrical device 4 memorized in the temporary storage unit 62 as the electrical device 4 to be controlled.

After the ECU control unit 64 of the ECU 2 connected to the power switch A3 has written the device data to the temporary storage unit 62, the ECU communication unit 61 of the ECU 2 connected to the power switch A3 transmits the ID data in which the main information indicates the ID of the ECU 2 to the apparatus communication unit 51 of the microcomputer 10. The apparatus control unit 53 of the microcomputer 10 changes the ID of the ECU 2 corresponding to the power switch A3 in the information table Ti to the ID indicated by the ID data received by the apparatus communication unit 51.

As described above, each ECU 2 can recognize the electrical device to be controlled, based on the device data received from the apparatus communication unit 51 of the microcomputer 10 after the specific switch is turned on. When the apparatus communication unit 51 of the microcomputer 10 transmits device data to a plurality of ECUs 2, only the ECU control unit 64 of the ECU 2 connected to the specific switch writes the transmitted device data to the temporary storage unit 62. Each ECU 2 recognizes the electrical device 4 indicated by the device data stored in the temporary storage unit 62 as the target to be controlled.

Furthermore, each ECU 2 transmits the ID data to the microcomputer 10 when the ECU 2 has written device data to the temporary storage unit 62. Therefore, the apparatus control unit 53 of the microcomputer 10 recognizes the electrical devices 4 respectively corresponding to the n power switches A1, A2, . . . , and An. Each time the power switch Ak switches from OFF to ON, the electrical device 4 corresponding to the power switch Ak is notified to the ECU 2 connected to the power switch Ak. Therefore, for example, even when the ECU 2 connected to the power switch A1 is changed to another ECU 2, the other ECU 2 can appropriately control the electrical device 4 corresponding to the power switch A1.

Second Embodiment

In the first embodiment, the communication apparatus 1 includes n power switches A1, A2, . . . , and An. However, the n power switches A1, A2, . . . , and An are not necessarily disposed inside the communication apparatus 1.

The following describes a second embodiment in terms of the differences from the first embodiment. Components other than those described below are the same as those in the first embodiment. Therefore, the same reference numerals as in the first embodiment are given to the same components as in the first embodiment, and the descriptions thereof will be omitted.

Configuration of Communication System E

Figure 7:
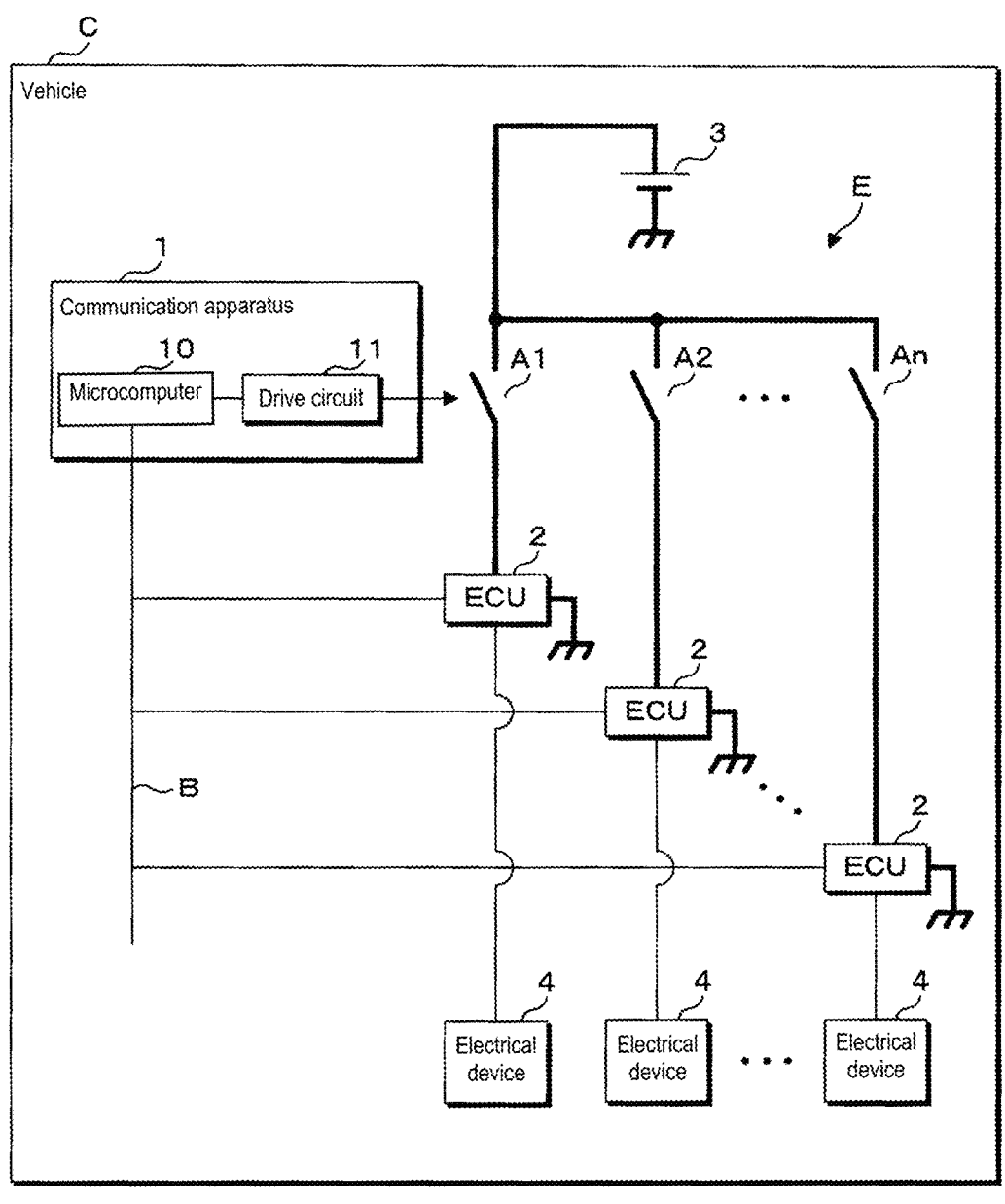
FIG. 7 is a block diagram showing a configuration of a main part of a communication system according to a second embodiment.

FIG. 7 is a block diagram showing a configuration of a main part of a communication system E according to the second embodiment. FIG. 7 corresponds to FIG. 1. When comparing the first and second embodiments, the locations where the n power switches A1, A2, . . . , and An are disposed are different. In the second embodiment, the n power switches A1, A2, . . . , and An are disposed outside the communication apparatus 1. As in the first embodiment, the communication system E includes the n power switches A1, A2, . . . , and An.

When the n power switches A1, A2, . . . , and An are disposed outside the communication apparatus 1, the communication apparatus 1 can be downsized. In addition, when a new electrical device 4 is to be added after the vehicle C has been shipped, the convenience of adding the new electrical device 4 is improved. Furthermore, the communication system E and the communication apparatus 1 according to the second embodiment respectively achieve the effects achieved by the communication system E and the communication apparatus 1 according to the first embodiment in a similar manner.

Note that the configuration of the communication system E is not limited to a configuration in which all the n power switches A1, A2, . . . , and An are disposed outside the communication apparatus 1. The communication apparatus 1 may also include one or more power switches of the n power switches A1, A2, . . . , and An. In this case, the other power switches are disposed outside the communication apparatus 1.

Third Embodiment

In the first embodiment, the communication apparatus 1 includes n power switches A1, A2, . . . , and An. However, the number of power switches included in the communication apparatus 1 may also be n−1. As described in the first embodiment, the integer n is greater than or equal to 2.

The following describes a third embodiment in terms of the differences from the first embodiment. Components other than those described below are the same as those in the first embodiment. Therefore, the same reference numerals as in the first embodiment are given to the same components as in the first embodiment, and descriptions thereof will be omitted.

Configuration of Communication System E

Figure 8:
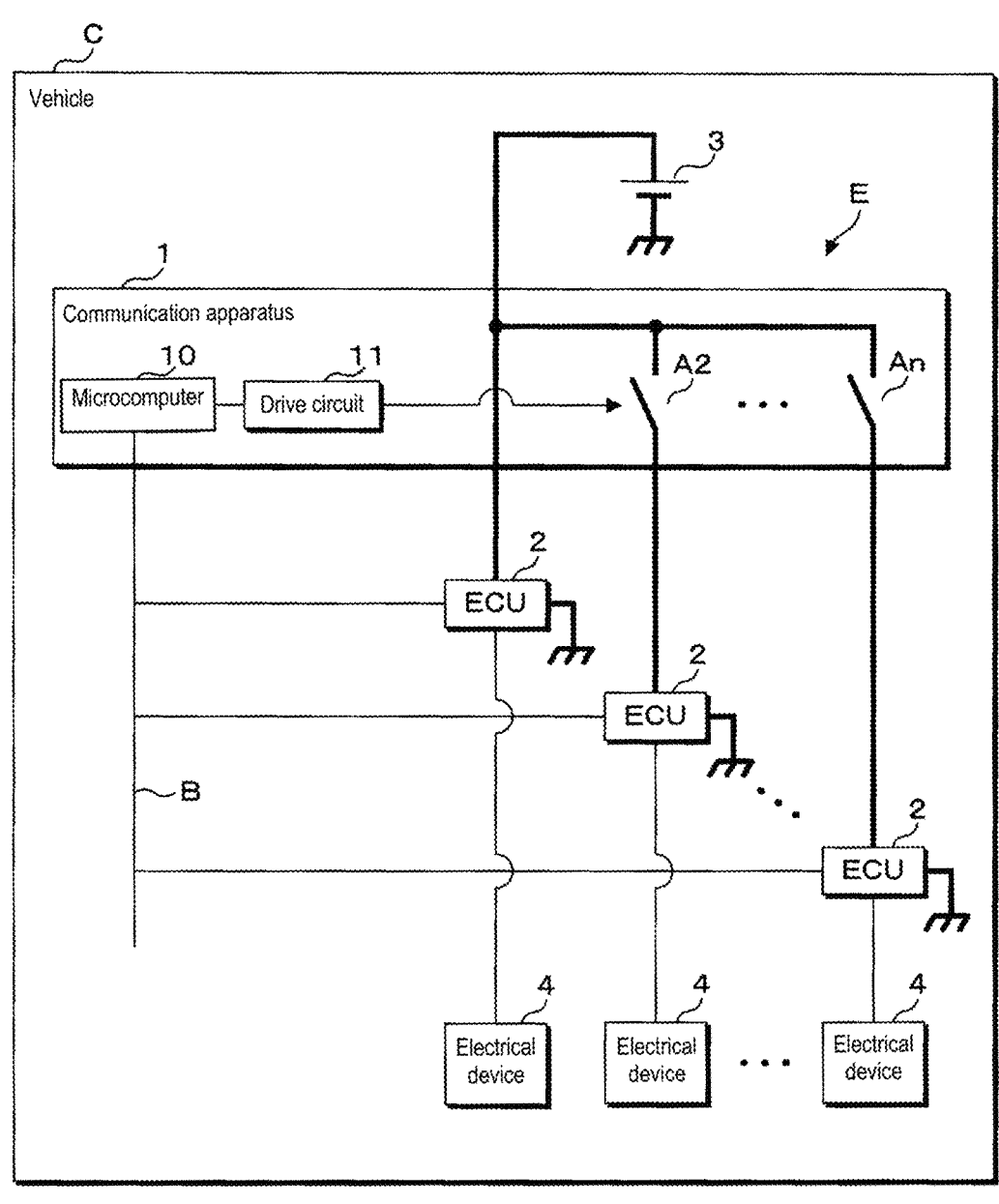
FIG. 8 is a block diagram showing a configuration of a main part of a communication system according to a third embodiment.

FIG. 8 is a block diagram showing a configuration of a main part of a communication system E according to a third embodiment. FIG. 8 corresponds to FIG. 1. In FIG. 8, wire conductors associated with power supply are expressed as bold lines. Wire conductors not associated with power supply and communication lines are expressed as thin lines. When comparing Embodiments 1 and 3, the number of power switches that the communication apparatus 1 includes is different. In the third embodiment, the communication apparatus 1 includes n−1 power switches A2, A3, . . . , and An. The microcomputer 10, the drive circuit 11, and the power switches A2, A3, . . . , and An are connected in the same manner as in the first embodiment.

The positive terminal of the DC power supply 3 is directly connected to an ECU 2 in addition to one end of each of the power switches A2, A3, . . . , and An. Current flows from the positive terminal of the DC power supply 3 to the ECUs 2 and the negative terminal of the DC power supply 3 in this order. As a result, power is supplied to the ECU 2 that is directly connected to the DC power supply 3. In the third embodiment, the n−1 power switches A2, A3, . . . , and An are provided for n−1 supply paths of the n supply paths for supplying power to the n ECUs 2, respectively.

Configuration of Microcomputer 10

As in the first embodiment, the information table Ti is stored in the apparatus storage unit 52 of the microcomputer 10. FIG. 9 is a chart showing the contents of the information table Ti. FIG. 9 corresponds to FIG. 4. FIG. 9 shows an example in which the integer n is 4. In the example in FIG. 9, the ECU 2 connected to the front-left window is directly connected to the positive terminal of the DC power supply 3. Therefore, the information table Ti does not show the power switch corresponding to the front-left window and the state corresponding to this power switch. In the information table Ti, one of the plurality of electrical devices 4 is associated with each of the n−1 power switches A2, A3, . . . , and An in advance.

The one or more processing devices included in the apparatus control unit 53 performs initial processing in addition to data transmission processing and change processing by executing the computer program Pm. Initial processing is processing that is performed when the microcomputer 10 is activated. The microcomputer 10 is activated when the ignition switch of the vehicle C is switched from OFF to ON, for example. The microcomputer 10 is deactivated when the ignition switch of the vehicle C is switched from ON to OFF, for example.

Initial Processing and Writing Processing

Figure 10:
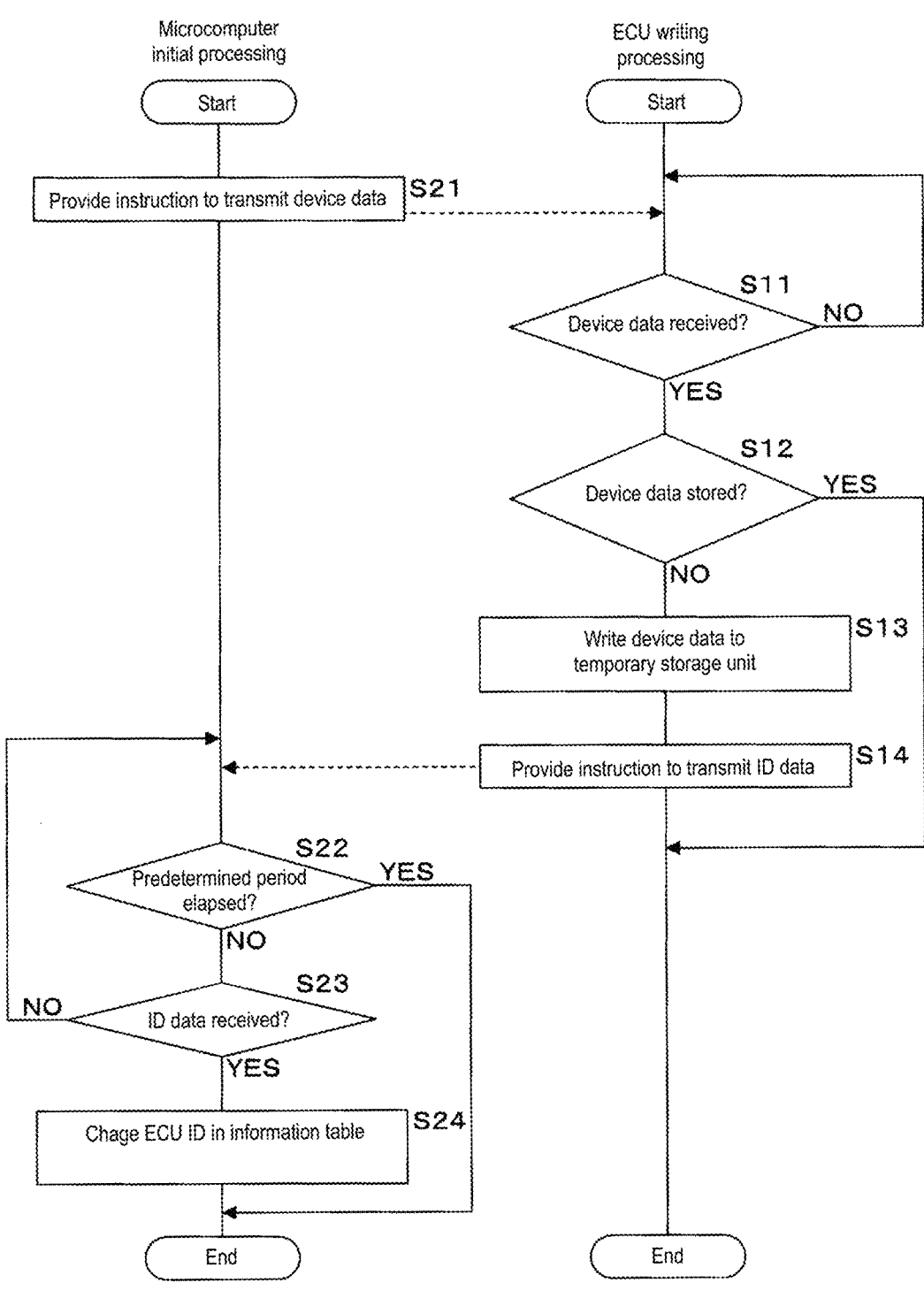
FIG. 10 is a flowchart showing procedures for initial processing and writing processing.

FIG. 10 is a flowchart showing procedures for initial processing and writing processing. The apparatus control unit 53 of the microcomputer 10 performs initial processing each time the microcomputer 10 is activated. In initial processing, the apparatus control unit 53 first provides an instruction to transmit, to n ECUs 2 via the communication bus B, the device data in the information table Ti indicating the electrical device 4 whose operation is to be controlled by the ECU 2 directly connected to the positive terminal of the DC power supply 3 (step S21).

The ECU control unit 64 of each ECU 2 performs writing processing as in the first embodiment. Therefore, when the ECU communication unit 61 receives device data, if device data different from the device data received by the ECU communication unit 61 is stored in the temporary storage unit 62, writing processing is terminated.

In the same case, if device data is not stored in the temporary storage unit 62, the ECU control unit 64 writes the device data received by the ECU communication unit 61 to the temporary storage unit 62. After writing the device data to the temporary storage unit 62, the ECU control unit 64 instructs the ECU communication unit 61 to transmit ID data to the microcomputer 10 and the other ECUs 2 via the communication bus B. The transmission destination information in the ID data indicates the ID of the microcomputer 10. The main information in the ID data indicates the ID of the ECU 2 that has written the device data to the temporary storage unit 62. After providing the instruction to transmit the ID data, the ECU control unit 64 terminates writing processing. After terminating writing processing, the ECU control unit 64 performs writing processing again.

In initial processing, after carrying out step S21, the apparatus control unit 53 of the microcomputer 10 determines whether or not a certain predetermined period has elapsed after carrying out step S21 (step S22). The period of time that has elapsed from when step S21 was carried out is measured using a timer (not shown), for example. If the apparatus control unit 53 determines that the predetermined period has not elapsed (S22: NO), the apparatus control unit 53 determines whether or not the apparatus communication unit 51 has received ID data (step S23). If the apparatus control unit 53 determines that the ECU communication unit 61 has not received ID data (S23: NO), the apparatus control unit 53 carries out step S22 again and waits until the predetermined period elapses or until the apparatus communication unit 51 receives ID data.

If the apparatus control unit 53 determines that the predetermined period has elapsed (S22: YES), the apparatus control unit 53 terminates initial processing. If the predetermined period of time elapses without the ECU communication unit 61 receiving ID data, it is assumed that device data is stored in the temporary storage unit 62 of the ECU 2 that is directly connected to the positive terminal of the DC power supply 3.

If the apparatus control unit 53 determines that the apparatus communication unit 51 has received ID data (S23: YES), the apparatus control unit 53 changes the ID of the ECU 2 corresponding to the electrical device 4 whose operation is to be controlled by the ECUs 2 directly connected to the positive terminal of the DC power supply 3 in the information table Ti to the ID indicated by the ID data received by the ECU communication unit 61 (step S24). In the example in FIG. 9, the apparatus control unit 53 changes the ID of the ECU 2 corresponding to the front-left window. After carrying out step S24, the apparatus control unit 53 terminates initial processing.

Change Processing

In step S1 of change processing according to the third embodiment, the apparatus control unit 53 of the microcomputer 10 determines whether or not to turn on one of the n−1 power switches A2, A3, . . . , and An. The power switch to be turned on of the power switches A2, A3, . . . , and An is the specific switch.

If the apparatus control unit 53 determines that none of the n−1 power switches A2, A3, . . . , and An is to be turned on (S1: NO), the apparatus control unit 53 carries out step S1 again, and waits until it is time to turn on one power switch of the n−1 power switches A2, A3, . . . , and An. When the apparatus control unit 53 determines that one power switch of the n−1 power switches A2, A3, . . . , and An is to be turned on (S1: YES), the apparatus control unit 53 carries out step S2.

Example Operations of Microcomputer 10 and Plurality of ECUs 2

Figure 11:
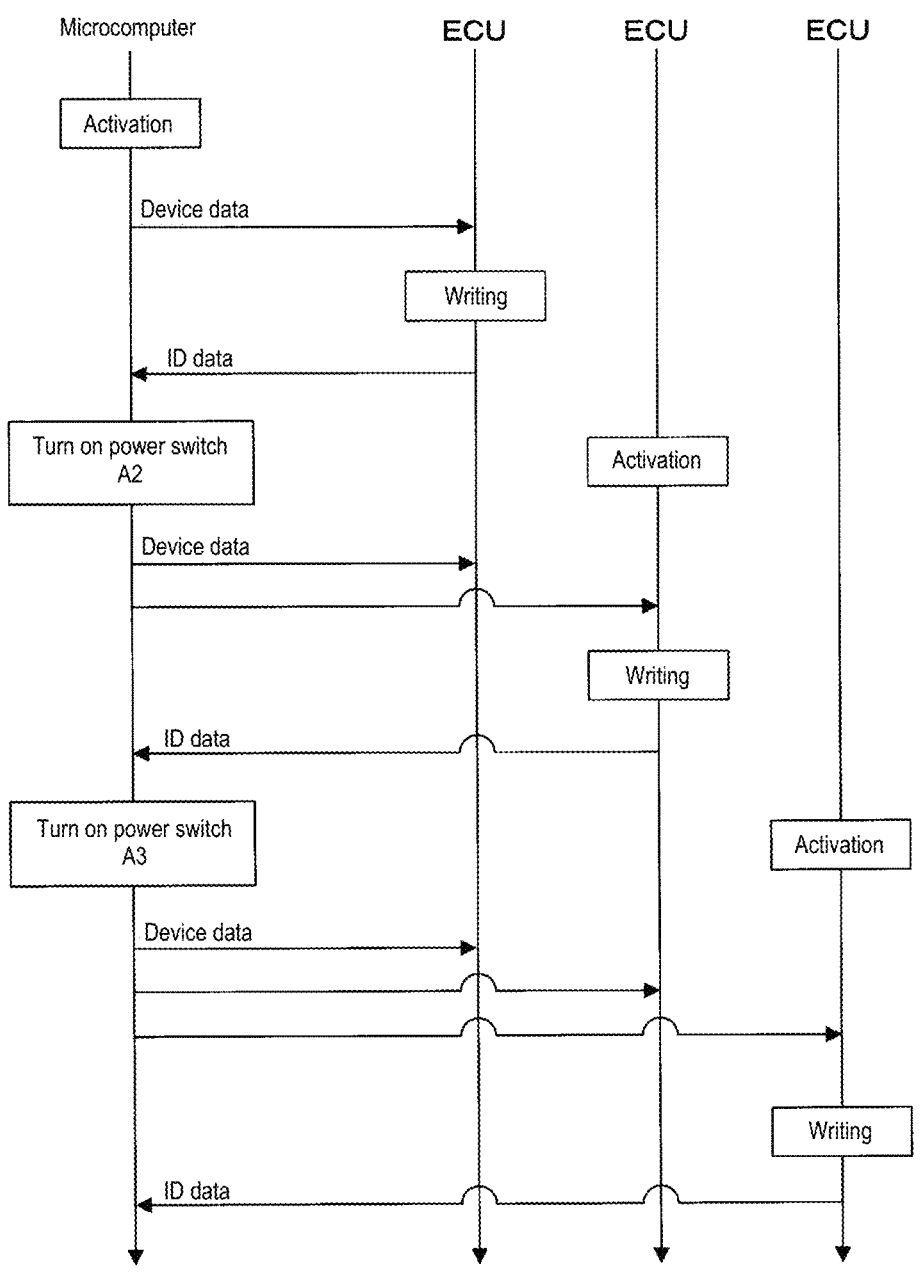
FIG. 11 is a sequence diagram showing example operations of a microcomputer and a plurality of ECUs.

FIG. 11 is a sequence diagram showing example operations of the microcomputer 10 and the plurality of ECUs 2. FIG. 11 corresponds to FIG. 6. FIG. 11 shows an example in which the integer n is 3. FIG. 11 shows the operations of the microcomputer 10 and the n ECUs 2 started when the microcomputer 10 is activated in the state where the n−1 power switches A2, A3, . . . , and An are OFF. Since the power switches A2, A3, . . . , and An are OFF, device data is not stored in the temporary storage units 62 of the n−1 ECUs 2.

The following three situations can be considered as situations in which device data is not stored in the temporary storage unit 62 of the ECU 2 directly connected to the DC power supply 3. The first situation is a situation in which the microcomputer 10 has not been activated even once after the communication system E was manufactured. The second situation is a situation in which the microcomputer 10 has not been activated after the ECU 2 directly connected to the DC power supply 3 was replaced with another ECU 2. The third situation is a situation in which the microcomputer 10 has not been activated even once after the power supply to the ECUs 2 from the DC power supply 3 was stopped.

When the microcomputer 10 is activated, the apparatus communication unit 51 of the microcomputer 10 transmits device data indicating the electrical device 4 whose operation is to be controlled by the ECU 2 directly connected to the positive terminal of the DC power supply 3 to the n ECUs 2 via the communication bus B. At this time, only the ECU 2 connected to the DC power supply 3 is activated, and therefore, only the ECU communication unit 61 of the ECU 2 directly connected to the DC power supply 3 receives the device data.

The ECU control unit 64 of the ECU 2 directly connected to the DC power supply 3 writes the device data received by the ECU communication unit 61 to the temporary storage unit 62. As a result, only the temporary storage unit 62 of the ECU 2 directly connected to the DC power supply 3 stores the device data indicating the electrical device 4 whose operation to be controlled by this ECU 2. The ECU control unit 64 recognizes the electrical device 4 memorized in the temporary storage unit 62 as the electrical device 4 to be controlled.

The operations of the microcomputer 10 and the n ECUs 2 performed after the apparatus control unit 53 of the microcomputer 10 instructs the drive circuit 11 to power on the power switch A2 that functions as the specific switch are the same as those in the first embodiment. The communication system E and the communication apparatus 1 according to the third embodiment respectively achieve the effects achieved by the communication system E and the communication apparatus 1 according to the first embodiment in a similar manner.

Fourth Embodiment

In the third embodiment, the communication apparatus 1 includes n−1 power switches A2, A3, . . . , and An. However, the n−1 power switches A2, A3*f*, . . . , and An are not necessarily disposed inside the communication apparatus 1.

Figure 12:
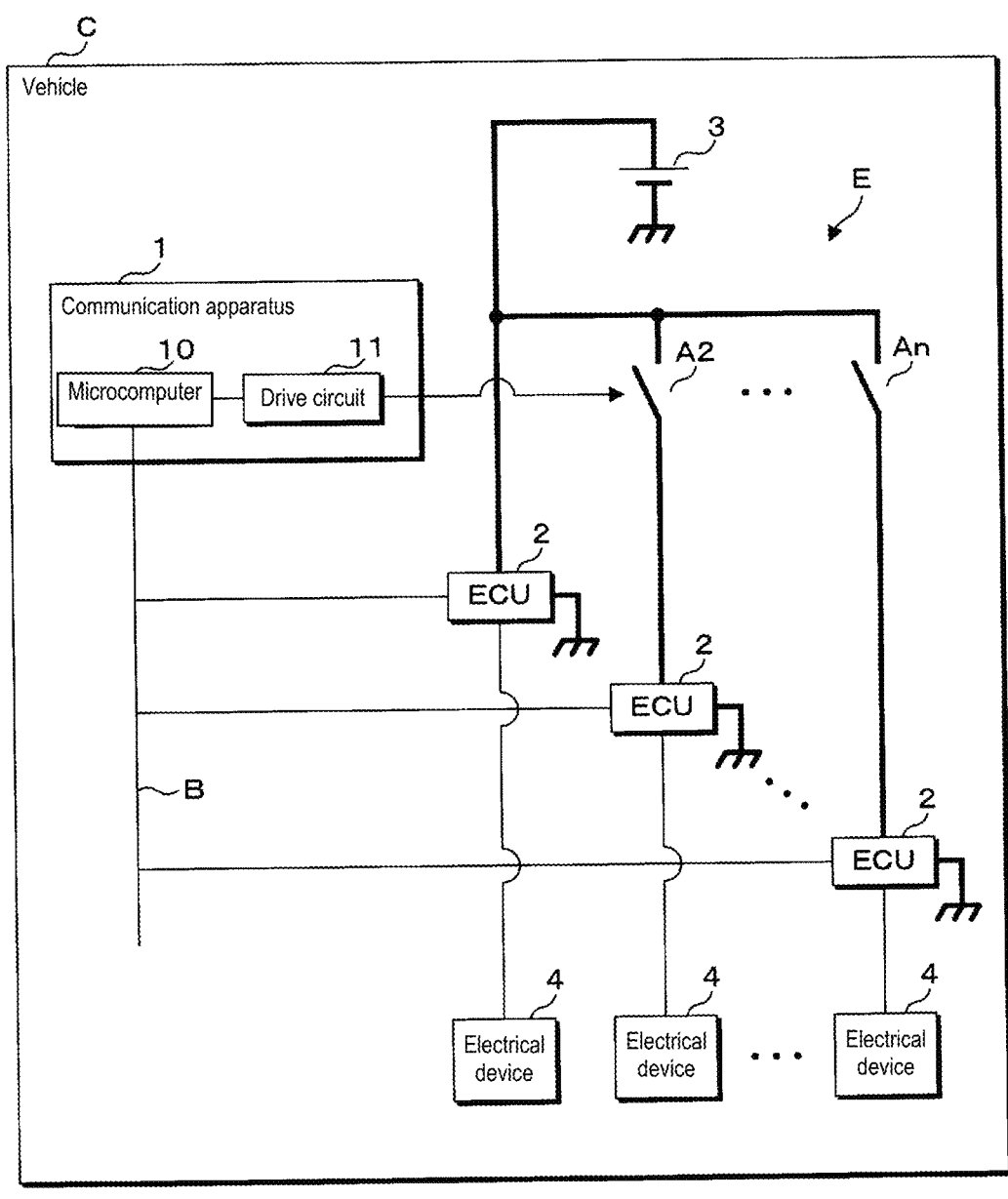
FIG. 12 is a block diagram showing a configuration of a main part of a communication system according to a fourth embodiment.

The following describes a fourth embodiment in terms of the differences from the third embodiment. Components other than those described below are the same as those in the third embodiment. Therefore, the same reference numerals as in the third embodiment are given to the same components as in the third embodiment, and the descriptions thereof will be omitted.
Configuration of Communication System E
FIG. 12 is a block diagram showing a configuration of a main part of a communication system E according to the fourth embodiment. FIG. 12 corresponds to FIG. 8. When comparing the third and fourth embodiments, the locations where the n−1 power switches A2, A3, . . . , and An are disposed are different. In the fourth embodiment, the n−1 power switches A2, A3, . . . , and An are disposed outside the communication apparatus 1. As in the third embodiment, the communication system E includes the n−1 power switches A2, A3, . . . , and An.

When the n−1 power switches A2, A3, . . . , and An are disposed outside the communication apparatus 1, the communication apparatus 1 can be downsized. In addition, when a new electrical device 4 is to be added after the vehicle C has been shipped, the convenience of adding the new electrical device 4 is improved. Furthermore, the communication system E and the communication apparatus 1 according to the fourth embodiment respectively achieve the effects achieved by the communication system E and the communication apparatus 1 according to the third embodiment in a similar manner.

Note that, when n is an integer greater than or equal to 3, the configuration of the communication system E is not limited to the configuration in which all the n power switches A2, A3 . . . , and An are disposed outside the communication apparatus 1. When n is an integer greater than or equal to 3, the communication apparatus 1 may include one or more power switches of the n−1 power switches A2, A3, . . . , and An. In this case, the other power switches are disposed outside the communication apparatus 1. When n is 2, the power switch A2 is disposed outside the communication apparatus 1. In addition, in the fourth embodiment, the connection line that directly connects the positive terminal of the DC power supply 3 and the ECU 2 may pass through the inside of the communication apparatus 1.

Fifth Embodiment

In the first embodiment, the apparatus communication unit 51 of the microcomputer 10 is connected to the ECU communication units 61 of the n ECUs 2 via the communication bus B. However, the apparatus communication unit 51 of the microcomputer 10 and the ECU communication unit 61 of the n ECUs 2 are not necessarily connected via the communication bus B.

Figure 13:
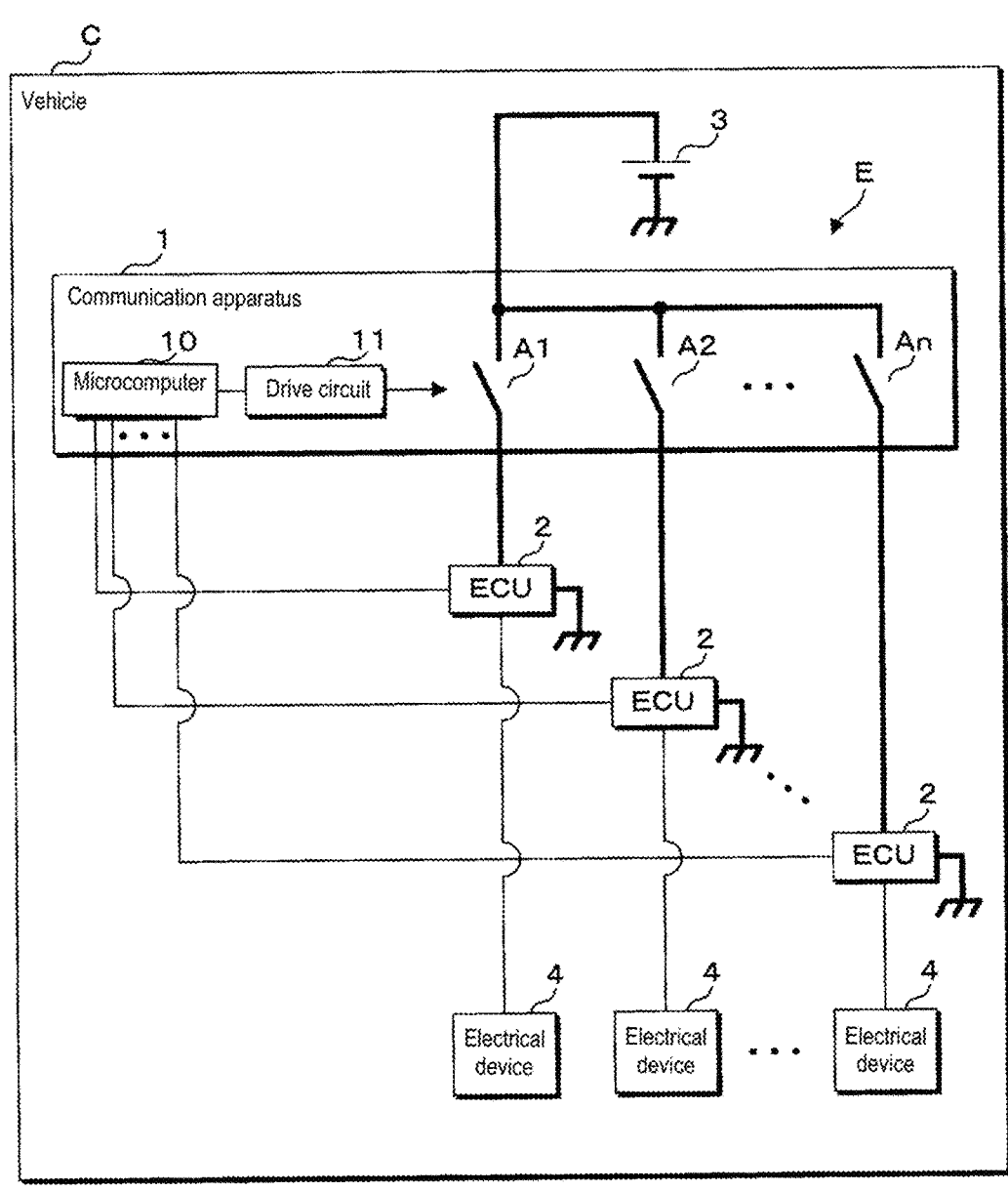
FIG. 13 is a block diagram showing a configuration of a main part of a communication system according to a fifth embodiment.

The following describes a fifth embodiment in terms of the differences from the first embodiment. Components other than those described below are the same as those in the first embodiment. Therefore, the same reference numerals as in the first embodiment are given to the same components as in the first embodiment, and the descriptions thereof will be omitted.
Configuration of Communication System E
FIG. 13 is a block diagram showing a configuration of a main part of a communication system E according to the fifth embodiment. FIG. 13 corresponds to FIG. 1. In FIG. 13, wire conductors associated with power supply are expressed as bold lines. Wire conductors not associated with power supply and communication lines are expressed as thin lines. The communication bus Bis not disposed in the communication system E according to the fifth embodiment. The apparatus communication unit 51 of the microcomputer 10 is connected to each of the respective ECU communication units 61 of the n ECUs 2. The apparatus communication unit 51 of the microcomputer 10 transmits data to each of the ECU communication units 61 of the n ECUs 2 according to an instruction from the apparatus control unit 53. The ECU communication unit 61 of each ECU 2 transmits data to the apparatus communication unit 51 of the microcomputer 10. In the fifth embodiment, transmission destination information need not been included in the data. Communication between the microcomputer 10 and the ECUs 2 is performed according to the Ethernet (registered trademark) protocol, for example.

As in the first embodiment, the apparatus communication unit 51 of the microcomputer 10 transmits device data to the ECU communication units 61 of the n ECUs 2. The apparatus communication unit 51 transmits data different from the device data to the ECU communication unit 61 of the ECU 2 of the electrical device 4 that is to perform a new operation. The ECU communication unit 61 of the ECU 2 transmits ID data to the apparatus communication unit 51 of the microcomputer 10.

The communication system E and the communication apparatus 1 according to the fifth embodiment respectively achieve the effects achieved by the communication system E and the communication apparatus 1 according to the first embodiment in a similar manner.

MODIFICATIONS

In the second to fourth embodiments, as in the fifth embodiment, the apparatus communication unit 51 of the microcomputer 10 may also be connected to each of the respective ECU communication units 61 of the n ECUs 2.

The technical features (constituent elements) described in the first to fifth embodiments can be combined with each other, and new technical features can be formed by combining these features.

The first to fifth embodiments disclosed herein should be considered to be illustrative in all respects and not restrictive. The scope of the present invention is indicated by the scope of the claims, not by the meaning described above, and is intended to include meanings equivalent to the scope of the claims and all changes within the scope.

The invention claimed is:

1. A communication system comprising:
   a plurality of control apparatuses configured to control respective operations of a plurality of on-board devices; and
   a communication apparatus configured to communicate with the plurality of control apparatuses,
   wherein the communication apparatus includes a processing unit configured to perform processing,
   one of the plurality of on-board devices is associated in advance with a switch provided for one of a plurality of supply paths for respectively supplying power to the plurality of control apparatuses,
   the processing unit of the communication apparatus is configured:
      to provide an instruction to turn on the switch; and
      after providing the instruction to turn on the switch, to provide an instruction to transmit device data to the plurality of control apparatuses, the device data including an identifier information that identifies an on-board device associated with the switch, information that associates the on-board device to a corresponding switch and a type or function of the on-board device,
   each of the plurality of control apparatuses includes:
      a data storage unit to which the device data is written; and
      a second processing unit configured to perform processing,
   the device data is deleted from the data storage unit when a power supply to any one of the plurality of control apparatuses is stopped,
   when device data has been received from the communication apparatus and device data is not stored in the data storage unit, the second processing unit writes the device data received from the communication apparatus to the data storage unit, when device data has been received from the communication apparatus and device data is stored in the data storage unit, the device data stored in the data storage unit is retained,
   when the second processing unit writes the device data received from the communication apparatus to the data storage unit, the second processing unit provides an instruction to transmit data to the communication apparatus, and
   the processing unit of the communication apparatus is configured:
      to receive the data transmitted from a control apparatus, and
   to change an information table storing for each switch, an association between the switch and the on-board device, operational state of the switch, and an identifier information of the control apparatus supplied by the switch, based on the received data.

2. The communication system according to claim 1, wherein a plurality of switches are provided,
   the plurality of switches are respectively provided for the plurality of supply paths,
   the plurality of switches are each associated in advance with one of the plurality of on-board devices, and
   the processing unit of the communication apparatus is configured:
      to provide an instruction to turn on a specific switch included in the plurality of switches; and
      after providing the instruction to turn on the specific switch, to provide an instruction to transmit device data indicating an on-board device corresponding to the specific switch, to the plurality of control apparatuses.

3. The communication system according to claim 2, wherein the plurality of on-board devices are configured to perform a same operation.

4. The communication system according to claim 2, wherein the communication apparatus includes one or more or all of the plurality of switches.

5. The communication system according to claim 4, wherein the plurality of on-board devices are configured to perform a same operation.

6. The communication system according to claim 1, wherein the plurality of supply paths are n supply paths,
   n is an integer greater than or equal to 2,
   n−1 switches are provided,
   the n−1 switches are respectively provided for n−1 supply paths,
   the n−1 switches are each associated in advance with one of the plurality of on-board devices, and
   the processing unit of the communication apparatus is configured:
      to provide an instruction to turn on a specific switch included in the n−1 switches; and
      after providing the instruction to turn on the specific switch, to provide an instruction to transmit device data indicating an on-board device corresponding to the specific switch, to the plurality of control apparatuses.

7. The communication system according to claim 6, wherein the plurality of on-board devices are configured to perform a same operation.

8. The communication system according to claim 6, wherein n is an integer greater than or equal to 3, and
   the communication apparatus includes one or more or all of the n−1 switches.

9. The communication system according to claim 8, wherein the plurality of on-board devices are configured to perform a same operation.

10. The communication system according to claim 1, wherein the plurality of on-board devices are configured to perform a same operation.

11. A communication apparatus that communicates with a plurality of control apparatuses configured to control respective operations of a plurality of on-board devices, comprising:

a processing unit configured to perform processing, wherein one of the plurality of on-board devices is associated in advance with a switch provided for one of a plurality of supply paths for supplying power to the plurality of control apparatuses respectively, and the processing unit is configured:

to provide an instruction to turn on the switch; and after providing the instruction to turn on the switch, to provide an instruction to transmit device data to the plurality of control apparatuses, the device data including an identifier information that identifies an on-board device associated with the switch, information that associates the on-board device to a corresponding switch and a type or function of the on-board device, each of the plurality of control apparatuses includes:

a data storage unit to which the device data is written; and a second processing unit configured to perform processing, the device data is deleted from the data storage unit when a power supply to a control apparatus is stopped, when device data has been received from the communication apparatus and device data is not stored in the data storage unit, the second processing unit is configured to write the device data received from the communication apparatus to the data storage unit, when device data has been received from the communication apparatus and device data is stored in the data storage unit, the device data stored in the data storage unit is retained, when the second processing unit writes the device data received from the communication apparatus to the data storage unit, the second processing unit is configured to provide an instruction to transmit data to the communication apparatus, and the processing unit is configure to:

receive the data transmitted from a control apparatus, and change an information table storing for each switch, an association between the switch and the on-board device, operational state of the switch, and an identifier information of the control apparatus supplied by the switch, based on the received data.

* * * * *